US 6,658,401 B2

(12) United States Patent
Utsumi et al.

(10) Patent No.: US 6,658,401 B2
(45) Date of Patent: Dec. 2, 2003

(54) INFORMATION PROVIDING APPARATUS, SERVER APPARATUS AND INFORMATION PROCESSING METHOD

(75) Inventors: Yoshimasa Utsumi, Tokyo (JP); Shigeyuki Yoneyama, Tokyo (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 09/854,787

(22) Filed: May 14, 2001

(65) Prior Publication Data

US 2002/0049721 A1 Apr. 25, 2002

(30) Foreign Application Priority Data

May 16, 2000 (JP) ........................................ 2000-148649

(51) Int. Cl.[7] .......................... G06F 17/30; G06F 7/00; G06F 17/00
(52) U.S. Cl. .......................................... 707/1; 707/104
(58) Field of Search ........................ 707/1, 6; 713/201; 705/39, 1

(56) References Cited

U.S. PATENT DOCUMENTS

| | | | | |
|---|---|---|---|---|
| 4,944,007 A | * | 7/1990 | Austin ........................ 713/180 |
| 5,260,999 A | * | 11/1993 | Wyman ........................ 705/59 |
| 5,634,012 A | * | 5/1997 | Stefik et al. ................... 705/39 |
| 5,666,479 A | * | 9/1997 | Kashimoto et al. ............ 714/1 |
| 5,842,023 A | * | 11/1998 | Tsumura ...................... 717/170 |
| 2001/0034846 A1 | * | 10/2001 | Beery .......................... 713/201 |
| 2001/0049707 A1 | * | 12/2001 | Tran ............................ 707/530 |

* cited by examiner

*Primary Examiner*—Frantz Coby
*Assistant Examiner*—Merilyn P Nguyen
(74) *Attorney, Agent, or Firm*—Frommer Lawrence & Haug LLP; William S. Frommer

(57) ABSTRACT

One network system according to the invention allows a party potentially disadvantaged by a third party's right globally to solicit information for contesting the right in question and to pay a reward to individuals or organizations for offering the information for invalidation. The system ensures that legitimate rights are protected while corporations are defended against unfair accusations and frivolous lawsuits. Another network system according to the invention allows a party potentially disadvantaged by a third party's right globally to recruit experts willing to take over proceedings on behalf of the disadvantaged party for invalidating the right in question, and to pay a contingent fee to those who successfully invalidated the right. The inventive system also ensures that legitimate rights are protected while corporations are defended against unfair accusations and frivolous lawsuits.

17 Claims, 13 Drawing Sheets

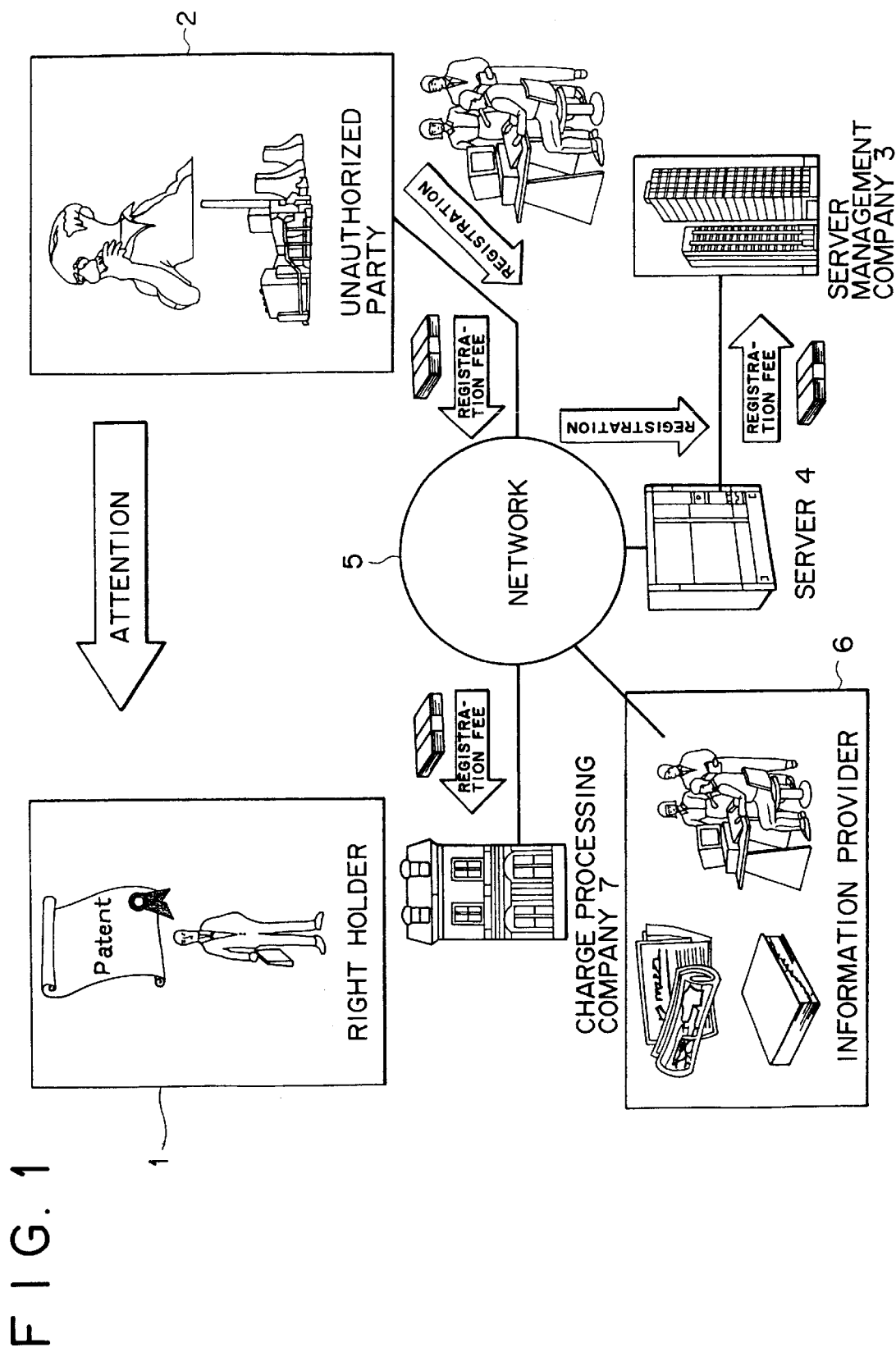
F I G. 1

FIG. 2 http://www.*****.com/ — 11

| Patent Number | Technical Field | Necessary Information |
|---|---|---|
| · JP△0×□□X — 13 | Chemistry | Theses, articles, etc., on XXX issued before ___(month), 19___(year) |
| · USP△0□□△000 — 14 | Electricity | Technical papers, documents, etc., on XXX issued before ___(month), 19___(year) |
| · EP□□△000□ — 15 | Machinery | Actual motors marketed by company A before ___(month), 19___(year), and/or their instruction manuals, specifications, etc |

PATENT GAZETTE — 24
PATENT GAZETTE — 25
PATENT GAZETTE — 26 mail to: XYZXYZ@*****.com

| English — 16 | French — 17 | German — 18 | Italian — 19 |

12

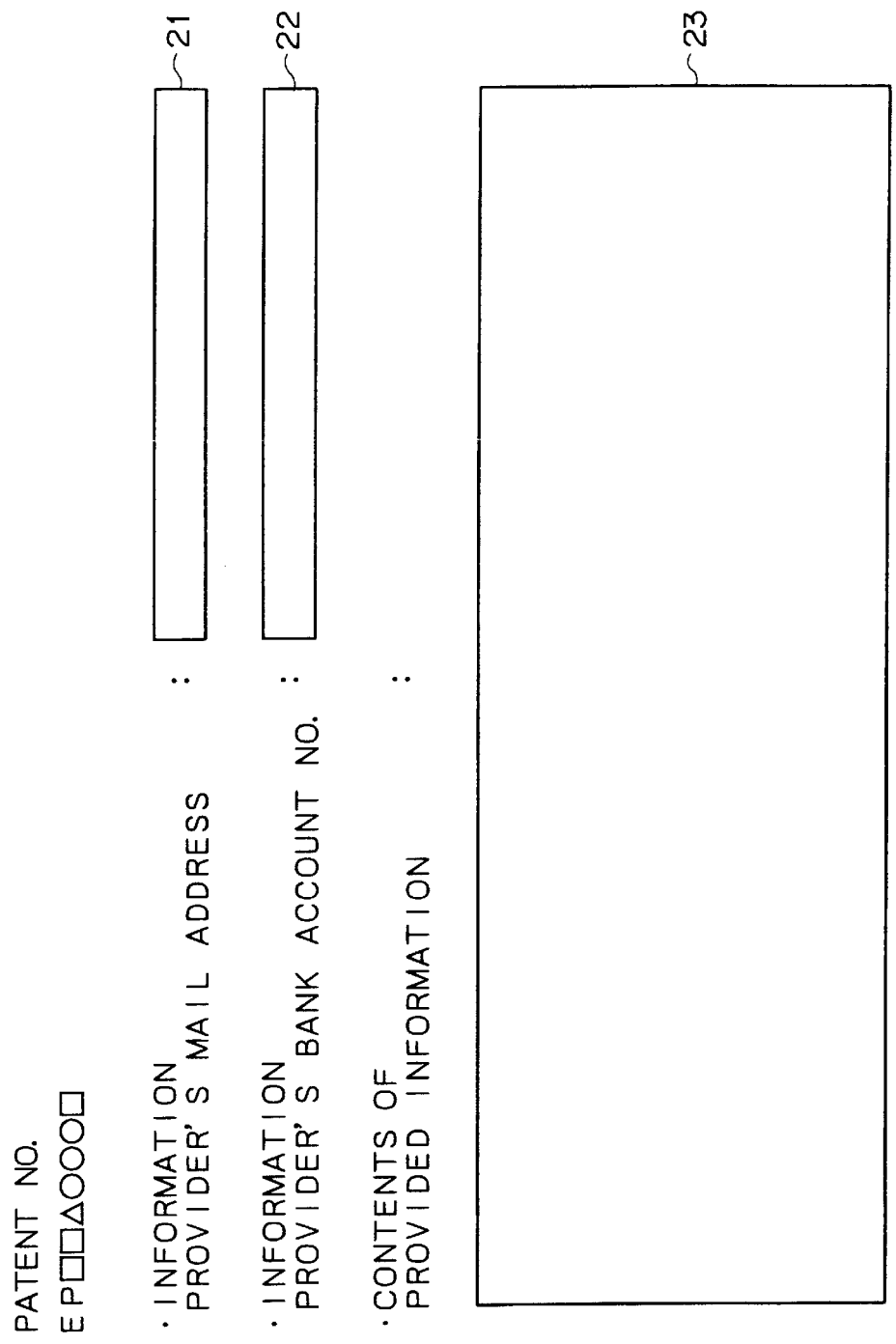

FIG. 6

PRESUMED LOSSES

| PRODUCT NAME | NO. OF UNITS SOLD:A | UNIT PRICE(¥):B | F.O.B(%):C | A×B×C |
|---|---|---|---|---|
| ○△× | 10000 | 10000 | 30 | ¥30,000,000 |
| △□○ | 20000 | 5000 | 20 | ¥20,000,000 |
| | | | | |
| | | | | |
| | | | | |
| | | | | |

FIG. 13

- Patent No.
  USP□△○×× ○○

Minimum Cotingent Fee($)

500000: Patent invalidated
100000: Interference avoided by amendment of claims

Your Name: Have your name entered if you think you can help file an opposition to above claim or help invalidate it by a trial for invalidation or through re-examination

- Company Name(Individual Name): ☐

- Mail Address: ☐

- Contingent Fee Paid To: ☐

INFORMATION PROVIDING APPARATUS, SERVER APPARATUS AND INFORMATION PROCESSING METHOD

BACKGROUND OF THE INVENTION

The present invention relates to an information providing apparatus, a server apparatus and an information processing method for actively stimulating the circulation of information.

Recent years have seen numerous cases where patent holders warn a third party (unauthorized party) against possible infringement of patents or other intellectual property rights, or bring lawsuits to those who are deemed to have violated in any way of the patent holders' rights.

In such cases, an unauthorized party having received a warning or become a defendant in a trial will seek to invalidate the accusing right holder's patent, utility model, trademark, design, copyright, etc. Illustratively, in order to find materials to invalidate the patent in dispute, the unauthorized party searches through patent gazettes, technical documents and magazines or products published or manufactured prior to the granting or filing of the patent in question; or sifts through instruction manuals and service manuals regarding related products. If relevant materials are uncovered, the unauthorized party files an opposition to the patent holder or seeks a trial for invalidation of the patent.

When looking for invalidating materials, the unauthorized party searches illustratively through databases designed for patent information retrieval or databases on technical documents.

If a patent holder brings a lawsuit against a third party, the third party as a defendant submits publicly known documents to the court with regard to the patent of interest. In such cases, too, databases on publicly known documents are often looked up in search of relevant materials.

The trouble is that databases through which to search for invalidating materials contain huge quantities of data. Those who try to look for the pertinent publicly known documents in these databases find it difficult to do so unless they are in possession of specialized know-how such as ways to determine suitable keywords in search of effective information.

Another problem is that publicly accessible databases contain few, if any, entries with respect to documents or products privately owned since before the granting or filing of the patent in dispute, or entries regarding documents testifying to the practice of related know-how by individuals prior to the patent. It is impossible for the general public to gain access to such unlisted information that may be effective for invalidating patent rights.

In particular, it may be desired to contest a right patented in one country by collecting technological information, documents, knowledge, know-how or expertise known in other countries around the world. Such efforts, however, have been thwarted so far by the linguistic differences and underdeveloped database facilities combined to pose virtually insurmountable hurdles.

Furthermore, to invalidate patent rights often requires highly specialized knowledge of patent attorneys, layers and other experts. In fact, the general public may have relevant invalidating information but may not be able to put it to effective use for lack of necessary expertise. When unauthorized parties seek to invalidate patent rights, they often require experts' help but find it difficult to decide whom to turn to for individual cases of litigation.

SUMMARY OF THE INVENTION

The present invention has been made in view of the above circumstances and provides an information providing apparatus, a server apparatus and an information processing method for constituting a system which allows unauthorized parties warned or sued by right holders to look for relevant materials for invalidating rights at issue or to seek otherwise to invalidate such rights.

In carrying out the invention and according to one aspect thereof, there is provided an information providing apparatus comprising: a first receiving element for receiving information entered by a registered party about a right held by a right holder, and information for charge processing with regard to the registered party; a storing element for storing the information which is entered by the registered party about the right held by the right holder and which is received by the first receiving element; a transmitting element for readably transmitting to the general public the information stored in the storing element with regard to the right held by the right holder; a second receiving element for receiving information which is transmitted by a reader for use in invalidating the right; and a charge processing element for effecting charge processing causing the registered party to pay a consideration to the reader for the information provided to invalidate the right, the charge processing being performed based on the information for charge processing with regard to the registered party.

According to another aspect of the invention, there is provided an information providing apparatus comprising: a first receiving element for receiving information entered by a registered party about a right held by a right holder, and information for charge processing with regard to the registered party; a storing element for storing the information which is entered by the registered party about the right held by the right holder and which is received by the first receiving element; a transmitting element for readably transmitting to the general public the information stored in the storing element with regard to the right held by the right holder; a second receiving element for receiving information which is transmitted by a reader as a token of willingness to invalidate the right; and a charge processing element which, if the reader invalidates the right, then effects charge processing causing the registered party to compensate the reader for the invalidation of the right.

According to a further aspect of the invention, there is provided a server apparatus for disclosing information entered by a registered party to the general public in order to solicit information from readers, the server apparatus comprising: a storing element for storing information entered by the registered party about a right held by a right holder; a transmitting element for readably transmitting to the general public the information stored in the storing element with regard to the right held by the right holder; a receiving element for receiving information which is transmitted by a reader for use in invalidating the right; a transferring element for transferring the information which is received by the receiving element from the reader, to the registered party for use in invalidating the right; and a notifying element which, if the registered party receives the information for invalidating the right, then notifies a charge processing system to make the registered party pay a consideration to the reader for the information provided by the reader.

According to an even further aspect of the invention, there is provided a server apparatus for disclosing information entered by a registered party to the general public in order to solicit information from readers, the server apparatus comprising: a storing element for storing information entered by the registered party about a right held by a right holder; a transmitting element for readably transmitting to the general public the information stored in the storing element with regard to the right held by the right holder; a receiving element for receiving information which is transmitted by a reader as a token of willingness to invalidate the right; and a notifying element which, if the reader invalidates the right, then notifies a charge processing system to make the registered party pay a consideration to the reader for the invalidation of the right.

According to a still further aspect of the invention, there is provided an information processing method for soliciting readers to provide information about a right which is held by a right holder and which is entered into a server by a registered party, the method comprising the steps of: firstly receiving from a reader the information about the right entered into the server by the registered party; transferring to the registered party the information received in the first receiving step with regard to the right; if the right is invalidated by use of the transferred information about the right, then secondly receiving a charge processing order from the registered party; and notifying a charge processing system to make the registered party pay a consideration to the reader based on the charge processing order received in the second receiving step.

According to a yet further aspect of the invention, there is provided an information processing method for soliciting readers to furnish tokens of willingness to invalidate a right which is held by a right holder and which is entered into a server by a registered party, the method comprising the steps of: firstly receiving information which is transmitted by a reader as a token of willingness to invalidate the right; transferring to the registered party the information received in the first receiving step; if the reader invalidates the right, then secondly receiving a charge processing order from the registered party; and notifying a charge processing system to make the registered party pay a consideration to the reader based on the charge processing order received in the second receiving step.

According to the invention, as outlined above, there is provided a system which allows an unauthorized party to collect invalidating information about a patent right in dispute or to recruit experts willing to execute necessary proceedings on behalf of the unauthorized party trying to invalidate the right at issue.

Other objects, features and advantages of the invention will become more apparent upon a reading of the following description and appended drawings.

BRIEF DESCRIPTION OF THE DRAWINGS

FIG. 1 is a schematic view showing an overall structure of a system practiced as a first embodiment of this invention;

FIG. 2 is a schematic view of a website display screen set up by a server management company in a manner readable by potential information providers;

FIG. 3 is a schematic view of an input screen into which an information provider can make entries with a view to offering information in his or her possession;

FIG. 6 is a schematic view of a table for calculating presumed losses that are registered with a server by an unauthorized party;

FIG. 13 is a schematic view of another website display screen set up by a server management company in a manner readable by potential information providers.

DESCRIPTION OF THE PREFERRED EMBODIMENTS

Figure 4:
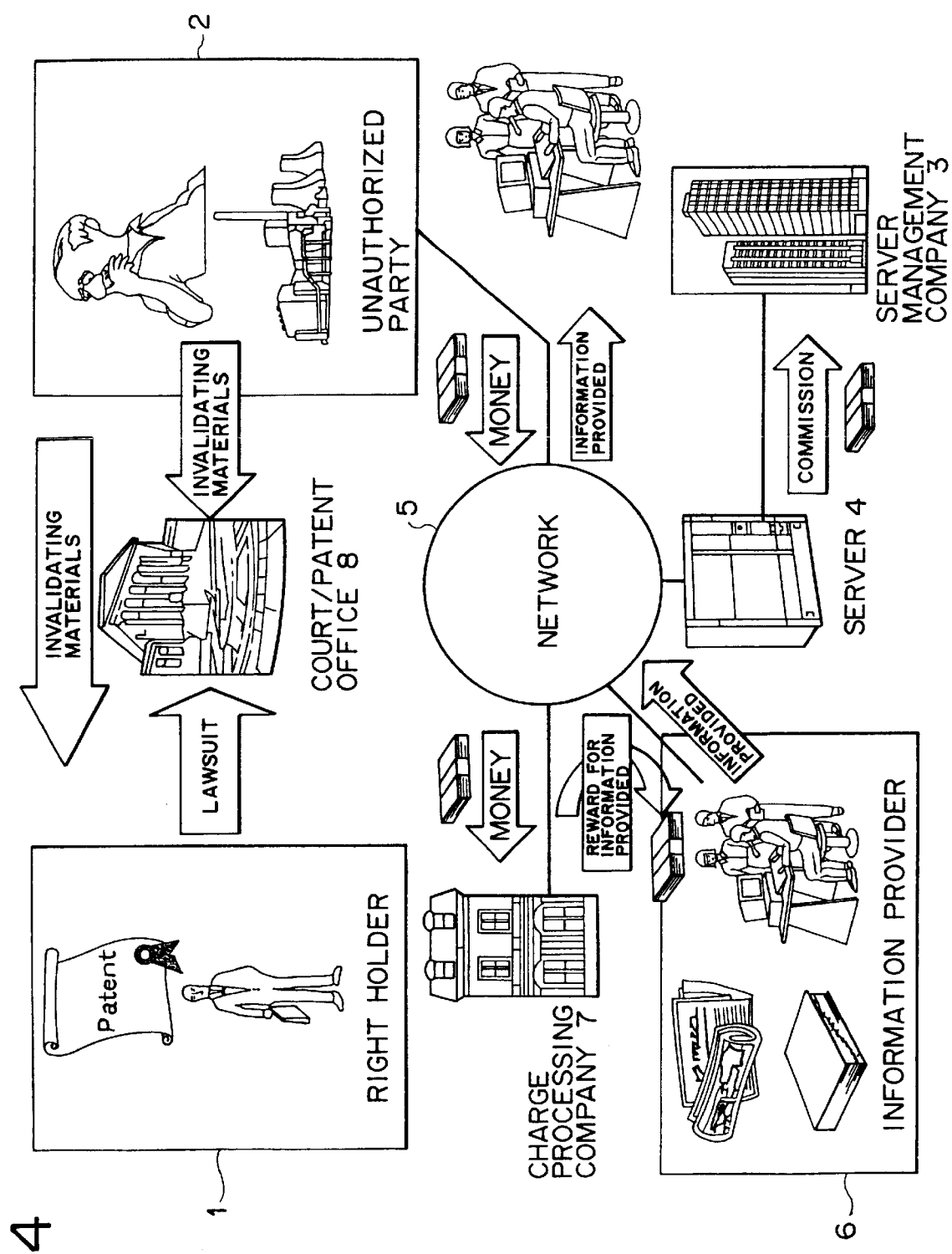
FIG. 4 is a schematic view showing flows of information and money exchanged within the first embodiment.

Preferred embodiments of this invention will now be described with reference to the accompanying drawings. A first embodiment to be described is a system suitable for collecting materials for invalidating patents or other rights that an unauthorized party seeks to invalidate. A second embodiment to be described is a system designed to recruit competent people willing to invalidate patents or other rights which the unauthorized party wishes to invalidate.

First Embodiment

FIG. 1 is a block diagram of a system practiced as the first embodiment of this invention. In FIG. 1, a right holder 1 represents a person or an entity in possession of intellectual property rights such as patents, utility models, trademarks, designs or copyrights. An unauthorized party 2 denotes a person or an entity that may be disadvantaged in future because of a right that belongs to the right holder 1.

A server 4, a server management company 3 and a charge processing company 7 transmit and receive information to and from the general public including the unauthorized party 2 over a network (communication lines and transmission channels) 5. In so doing, these organizations carry out processes desired by registered parties (unauthorized parties 2).

Information providers 6 are those who browse information over the network 5. They are people who may be able to provide the unauthorized party 2 with useful information.

The server management company 3 is an organization that runs websites on the Internet so as to mediate between unauthorized parties 2 who seek pertinent information and information providers 6 who may offer what is being looked for.

Suppose now that an unauthorized party 2 may in future be disadvantaged because of a patent, a utility model, a trademark, a design, a copyright or other intellectual property right in the possession of a right holder 1. In that case, the unauthorized party 2 enters into the server 4 of the server management company 3 over the network 5 pertinent information concerning the right (patent, trademark, design, copyright, etc.) that is at issue, i.e., information about the right of the right holder 1. In other words, the unauthorized party 2 registers with the server 4 in order to solicit extensively from the general public known materials and prior documents that may be used to invalidate, or avert interference with, the right in question of the right holder 1.

Specifically, by use of a terminal such as a personal computer (not shown) connected to the network 5, the unauthorized party 5 enters into the server 4 information about the right that may become detrimental to the party's interests, such as a patent number, an outline of the patent, the right holder's name, and other information needed to invalidate the right.

Communication lines constituting the network 5 may include ISDN (Integrated Service Digital Network), analog lines, public switched lines, satellite links, and mobile phone channels.

Through the terminal, the unauthorized party 2 also enters such information as the name of the party as an individual or as a company, a phone number, an e-mail address, a credit card number, and/or a bank account number. The information is registered as well with the charge processing company 7 that operates in coordination with the server 4 or server management company 4.

The charge processing company 7 processes a registration fee that the unauthorized party 2 pays to the server management company 3 in accordance with the credit card number or bank account number entered above. In this case, part of the amount paid by the unauthorized party 2 may be appropriated as a commission to the charge processing company 7.

Through processing of the charge processing company 7, the registration fees paid illustratively from bank accounts of the unauthorized parties 2 are appropriated as operating costs to the server management company 3.

The data entered by an unauthorized party 2 with regard to the right in dispute of a right holder 1 are disclosed at a website run by the server management company 3. Preferably, the data are disclosed after being edited in several languages by the server management company 3 so that people all over the world may read about them. In this setup, pertinent information for invalidating the right in question is solicited globally.

The name, e-mail address, phone number, etc., of the unauthorized party 2 as a company or as a private person are not disclosed at the website in order to maintain the party's anonymity. These items of information are either encrypted when stored on the server 4, or placed on a different server that is protected against unscrupulous access from the outside.

Such precaution is needed to maintain the unauthorized party's anonymity so that the party will not be warned or sued by the right holder 1 in possession of the right being targeted by the party. Illustratively, if the right holder 1 comes to know that information about his right is disclosed at a website by an unauthorized party 2 seeking to invalidate the right and if the identify of the unauthorized party 2 is disclosed, the registration at the website can turn out disadvantageous to the unauthorized party 2.

The server management company 3 discloses at its website part or all of the information about the right in dispute so that any third party may gain access to the information at the site. The information is disclosed at the website illustratively as shown in FIG. 2.

An input window 11 shows a URL (Uniform Resource Locator) address of the website run by the server management company 3. A main display area 12 includes regions 13, 14 and 15 indicating specific rights in dispute entered by unauthorized parties 2 along with patent numbers, technical fields of the rights and necessary information about these rights at issue. Also included are link keys 24, 25, 26 pointing illustratively to patent gazettes detailing the rights in question.

Keys 16, 17, 18, 19, etc., are provided corresponding to such languages as English, French, German and Italian. Using a mouse attached to a personal computer, readers who speak one of these languages may click on the key of the familiar language to go to the pages describing the same contents of FIG. 2 in the language selected.

A reader browsing the website may click on one of the portions indicative of the rights at issue (e.g., an underlined portion) by use of the mouse. The click action brings about an input screen shown in FIG. 3 through which information about the clicked-on right may be offered.

Upon accessing the website run by the server management company 3, an information provider 6 reads information about the listed rights in dispute as well as information solicited by those who have registered with the website, as shown in FIG. 2. Based on the information thus read, the information provider 6 decides whether the technical information, documents, products, etc., in his or her possession are effective for invalidating any of the rights listed at the website. If the information or any other material is judged to be useful, the information provider 6 first clicks on the applicable patent number underlined in FIG. 2 to call up the input screen of FIG. 3. The information provider 6 then notifies by e-mail the server management company 3 of his or her willingness to provide the information or material or may put a posting at the website saying that he or she is in possession of potentially useful information.

When putting a posting at the website reporting the possession of pertinent materials, the information provider 6 first clicks on the underlined portion of the right in question in the screen of FIG. 2 using the mouse or the like as mentioned above. This bring about the information provider's input screen of FIG. 3.

The screen of FIG. 3 is principally made up of three windows: a mail address input window 21 to which to write an e-mail address for allowing the information provider to communicate with the server management company; an account number input screen 22 that accommodates a bank account number or a credit card number of the information provider 6—the number representing the account to which a consideration or a contingent fee for the provided information is transferred as will be described later; and a detailed information input window 23 in which to write detailed information to be offered. If the documents, information, etc., that may be offered by the information provider 6 are constituted by electronic data, they may be sent as an attachment to the information provider's e-mail to the server management company 3.

Upon detecting the arrival of an e-mail or a posting at the website from an information provider 6, the server management company 3 notifies by e-mail or by telephone the unauthorized party 2 in the potentially disadvantaged situation that the mail or posting has arrived.

In turn, the unauthorized party 2 acquires information (documents, materials, products, etc.) from the information provider 6 by way of the server management company 3. The party 2 then determines whether the information is sufficient to invalidate the right in dispute.

During the exchanges, any direct contact between the information provider 6 and the unauthorized party 2 is avoided to maintain the latter's anonymity. All information is to be exchanged by way of the server management company 3.

Once the relevant information is handed over to the unauthorized party 2, the party 2 pays a reward to the information provider 6 via the server management company 3 as shown in FIG. 4. In this case, too, the charge processing company 7 processes the payment by the unauthorized party 2 illustratively through a money transfer from the party's bank account to that of the information provider 6.

The amount of the reward for the information provided may be determined by patent attorneys and lawyers of the server management company 3 evaluating the information offered by the information provider 6 (e.g., whether the information is effective, invalid, etc.). Alternatively, a fixed amount may be paid to the information provider 6 for the information offered.

Whereas the reward for the information provided is paid by the unauthorized party 2 to the information provider 6, part of the amount disbursed by the party 2 may be appropriated as a commission to the charge processing company 7 and/or to the server management company 3. The server management company 3 may also consider receiving from the unauthorized party 2 fees for the patent attorneys and lawyers for evaluating the offered information.

Using the information collected from one or a plurality of information providers 6, the unauthorized party 2 seeks a trial for invalidation or files an opposition to the right holder in question so as to invalidate the right at issue. In such cases, the server management company 3 may, on behalf of the unauthorized party 2, file for a trial for invalidation, file an opposition to the contested right holder, or perform other related proceedings.

Figure 5:
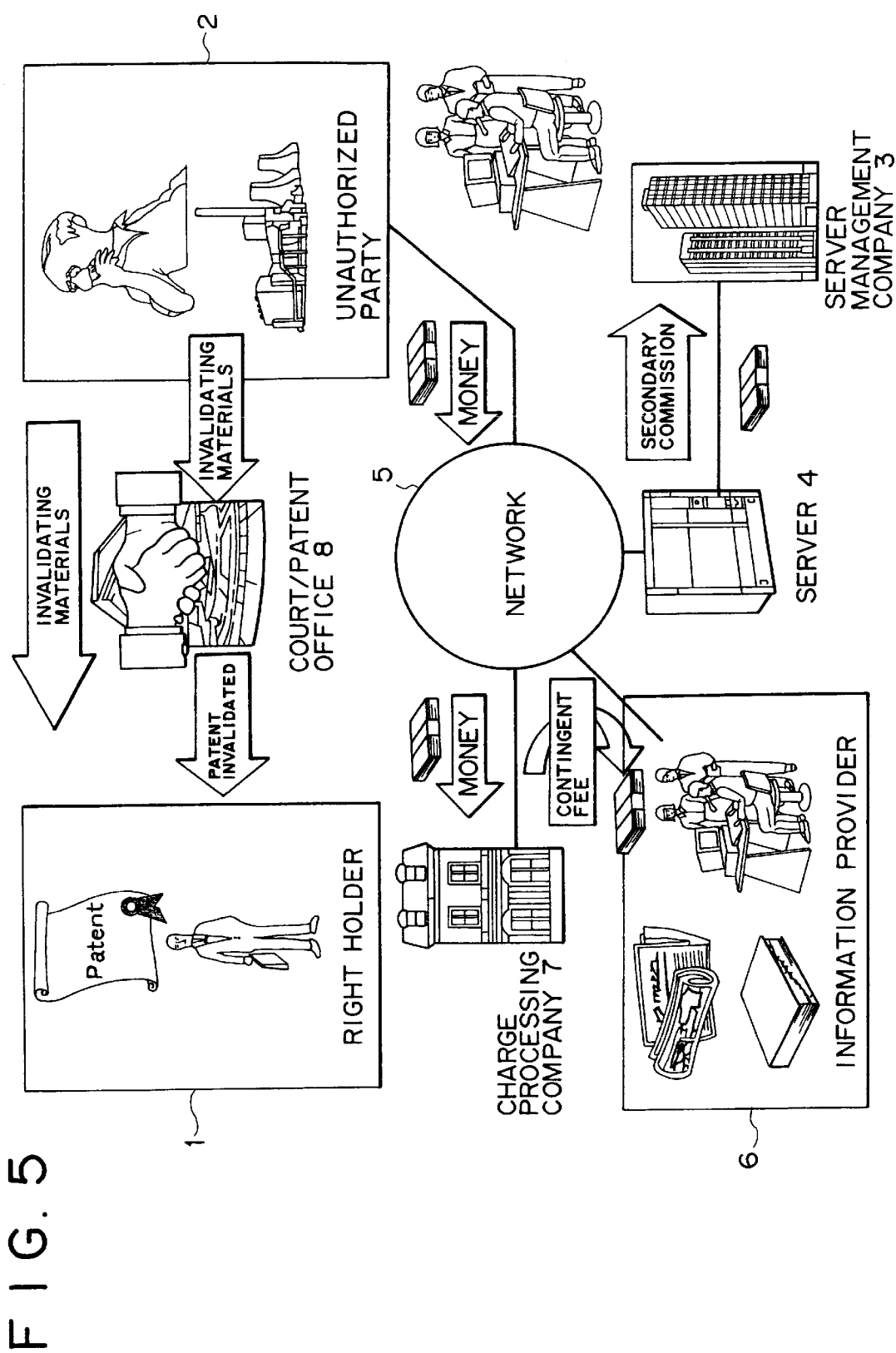
FIG. 5 is another schematic view depicting flows of information and money exchanged within the first embodiment.

As shown in FIG. 5, the unauthorized party 2 may get the court or the patent office to invalidate the right of the patent holder successfully using materials provided by the information provider 6. In that case, the unauthorized party 2 makes a third payment to the server management company 3 and information provider 6 as contingent fees. Specifically, the charge processing company 7 charges the unauthorized party 2 for the successful invalidation and causes the party 2 to pay the money to the server management company 3 and information provider 6.

In the event of a settlement reached between the contending parties using the furnished materials, the unauthorized party 2 still makes a third payment to the server management company 3 and information provider 6 as contingent fees by way of the charge processing company 7.

The amounts paid as contingent fees by the unauthorized party 2 may vary depending on the case being a trial for opposition, a trial for invalidation, or a court case.

In the case of a settlement, the server management company 3 may automatically calculate a presumed amount of damage applicable if the patent proved effective and may reimburse a predetermined percentage of the calculated amount to the information provider 6 as a contingent fee.

For example, as shown in FIG. 6, the server management company 3 determines the number (A) of products presumed to be sold and applicable to compensation for damage if the right in question were not invalidated, the unit price (B) of the product, and an FOB (free on board) percentage (C) of the presumed sales. The three parameters when multiplied altogether (A×B×C) amount to a total of ¥50,000,000 in this example. The unauthorized party 2 pays 10 percent of the total amount, i.e., ¥5,000,000 as a contingent fee. The server management company 3 receives 10 percent of the contingent fee, i.e., 536 500,000 as a commission and pays the remaining ¥4,500,000 to the information provider 6.

To get the above computations done by the server management company 3 requires that the unauthorized party 2 input through a personal computer the three parameters needed: the number of products presumed to be sold (A), the unit price of the product (B), and the FOB percentage (C), so that the input data will be transmitted to the company 3 over the network.

Figure 7:
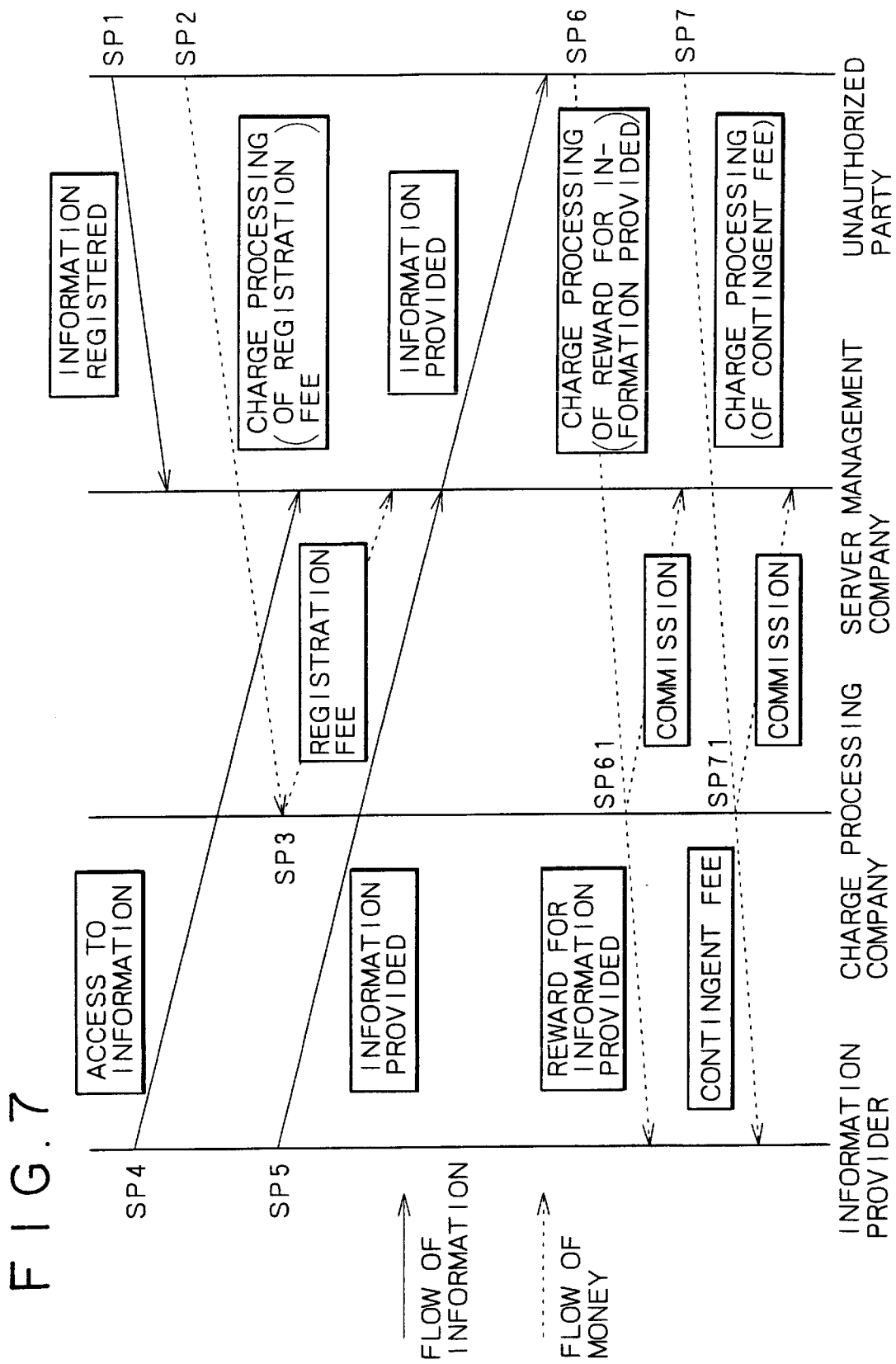
FIG. 7 is a transaction diagram sketching flows of information and money within the first embodiment.

FIG. 7 is a transaction diagram showing typical flows of information and money in the above-described system. In step SP1, the unauthorized party 2 (i.e., registered party) gains access to the website of the server management company 3. The party 2 enters information about the right in question of the right holder 1 into the server. In step SP2, the unauthorized party 2 transmits to the charge processing company 7 relevant information necessary for the company 7 to process a registration fee to be withdrawn from the party's bank account or credit card account.

In step SP3, the charge processing company 7 withdraws an amount equivalent to the registration fee from the registered party's account and transfers the payment to the server management company 3.

In step SP4, the information provider 6 gains access to the website run by the server management company 3 and browses information entered by the registered party (unauthorized party 2). If the information provider 6 is in possession of any information relevant to the browsed information, step SP5 is reached in which the information provider 6 notifies the server management company 3 of his or her willingness to offer information or transmits presumably useful information itself to the company 3. The server management company 3 forwards to the unauthorized party 2 (registered party) the information offered by the information provider 6.

In step SP6, processing is performed to have a compensation paid for the offered information. More specifically, in step SP61, the charge processing company 7 transfers a reward for the information provided from the account of the unauthorized party 2 to that of the information provider 6 while paying a commission to the server management company 3. Since the charge processing company 7 carries out charge processing services on behalf of the server management company 3, the charge processing company 7 may charge the server management company 3 an agent fee for taking over the services.

If the unauthorized party 2 has invalidated or otherwise dealt with the right in question successfully using the offered information, step SP7 is reached in which payment of a contingent fee is processed. More specifically, in step SP71, the charge processing company 7 transfers the contingent fee from the account of the unauthorized party 2 to that of the information provider 6 while paying a commission to the server management company 3 as well. In this case, too, the charge processing company 7 may charge the server management company 3 an agent fee for taking over the charge processing.

With the above-described system, the unauthorized party 2 can solicit information necessary for invalidating, or averting interference with, the right of the right holder 1 or for reaching a settlement with the right holder 1. The system makes it significantly easier for the unauthorized party 2 to accomplish hitherto-difficult collection of pertinent information useful for invalidating or otherwise dealing with rights at issue.

The inventive system allows the information provider 6 to profit from offering information in his or her possession. Information that would otherwise be deemed insignificant and left unused can thus be turned to profit.

Using the system, the server management company 3 can stimulate circulation of information and thereby promote public interests.

The inventive system allows the unauthorized party 2 (registered party) to remain anonymous for the information provider 6 because solicitation of information and payment of reward money are all handled by way of the server management company 3 or charge processing company 7. There occurs no disadvantage to the unauthorized party 2 trying to collect relevant information through the use of the system.

In the description above, the registered party (unauthorized party 2) was shown paying fees three times: upon registration, when receiving information, and when invalidating or otherwise dealing with the right at issue successfully using the offered information. However, this payment scheme is not limitative of the invention. Illustratively, the registration may be done free of charge. As another alternative, no contingent fee may be paid when the right is successfully extinguished. That is, the payment may be made only once instead of three times.

Figure 8:
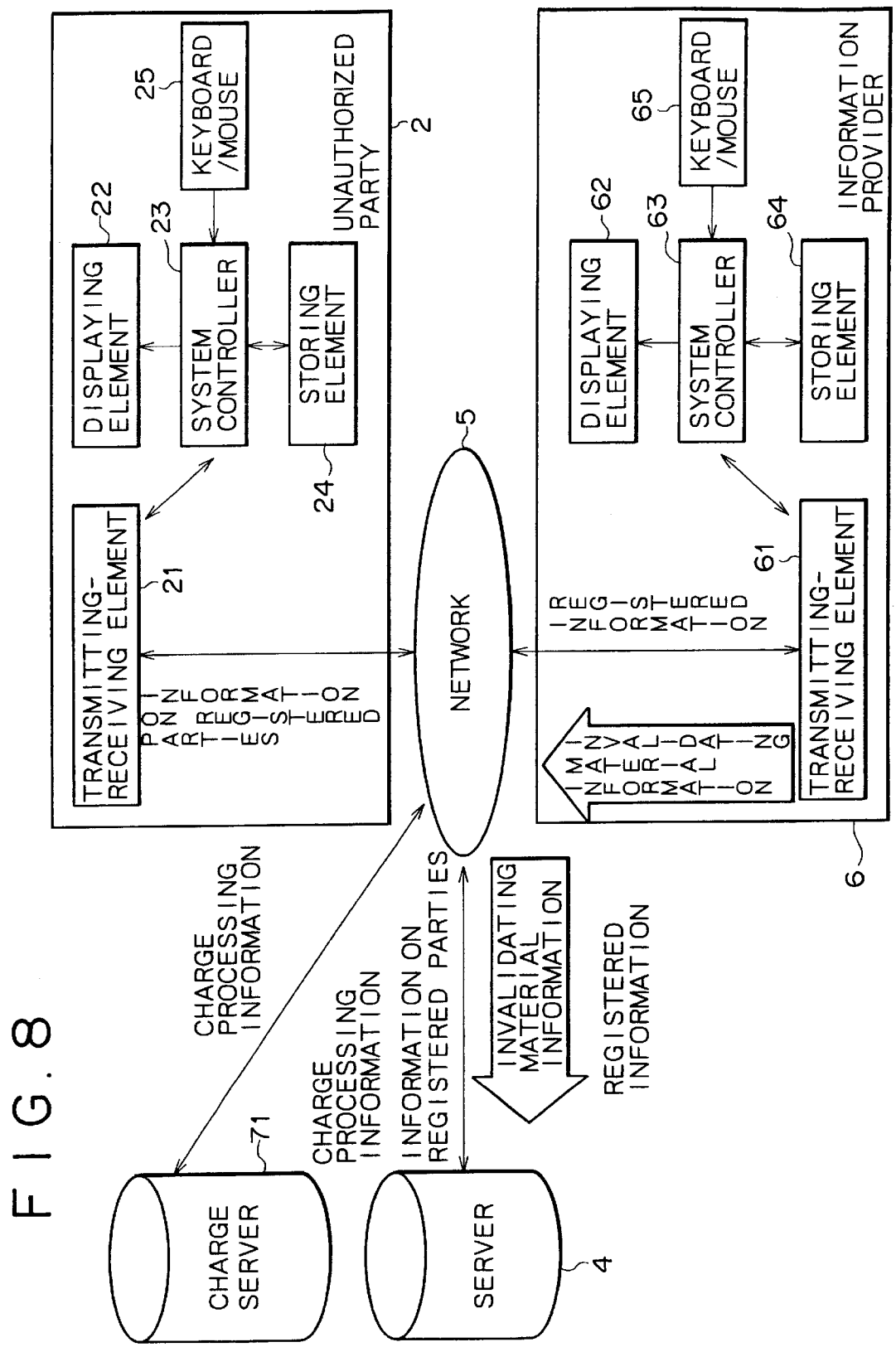
FIG. 8 is a block diagram sketching a typical hardware structure of the first embodiment.
Figure 9:
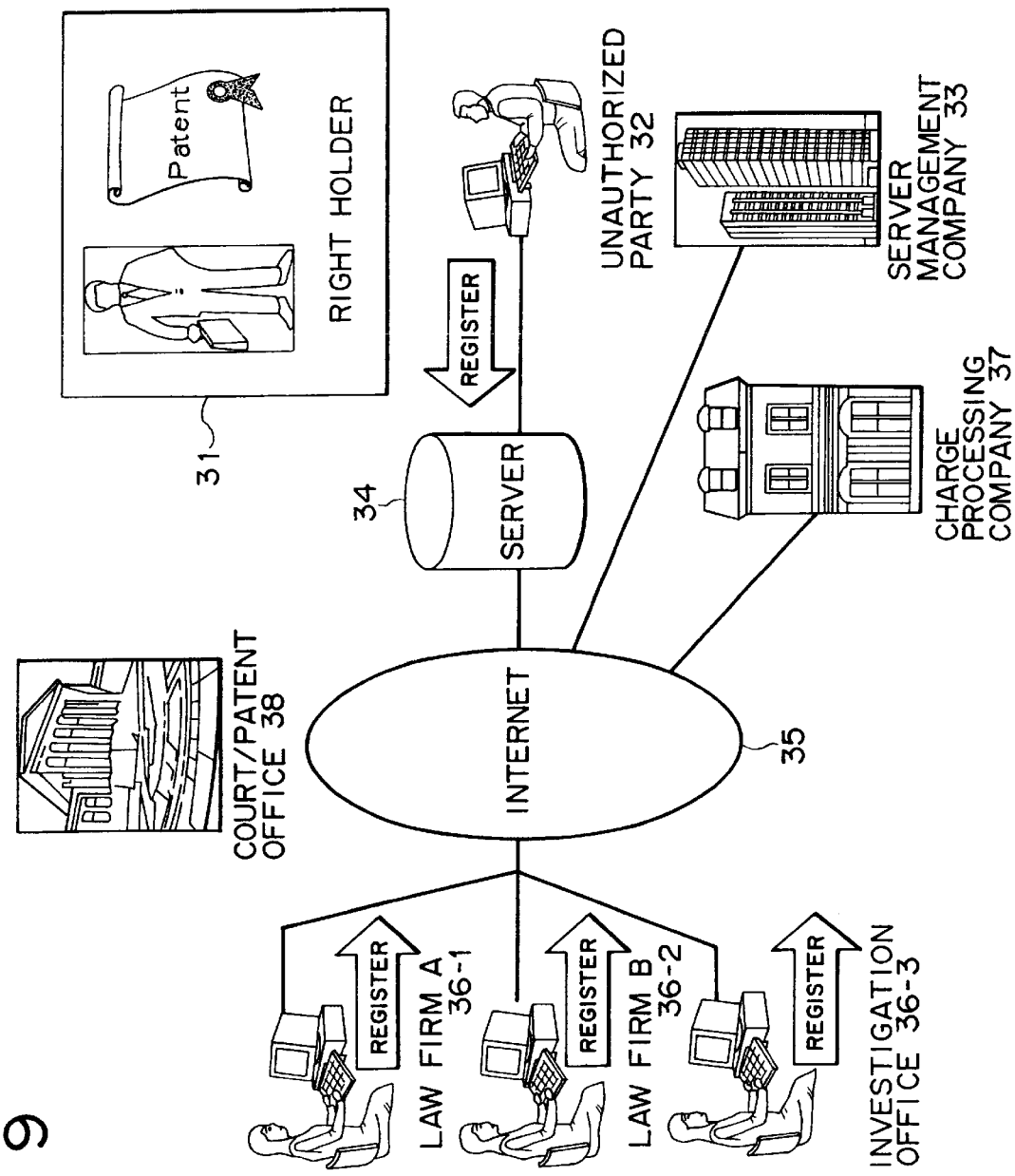
FIG. 9 is a schematic view presenting an overall structure of a system practiced as a second embodiment of this invention.

FIG. 8 shows a typical structure of hardware needed to let the unauthorized party 2 and information provider 6 exchange information using the first embodiment. As described with reference to FIG. 1, the unauthorized party 2 utilizes a data input apparatus illustratively composed of a personal computer in making entries about the contested right of a third party. The personal computer comprises: a transmitting-receiving element 21 such as a modem for connecting to a suitable network; a displaying element 22 for displaying information received by the transmitting-receiving element 21; an inputting element 25 made of a keyboard and/or a mouse used by the unauthorized party 2 to register necessary information; a storing element 24 constituted by a hard disc drive, a memory, etc., for storing the information input through the inputting element 25 or received by the transmitting-receiving element 21; and a system controller 23 for controlling the transmitting-receiving element 21, displaying element 22, storing element 24 and other components.

The unauthorized party 2 first gains access to the URL address of the website run by the server management company 3. Using the inputting element 25 made of the keyboard and/or the mouse, the party 2 then becomes a registered party by registering, on a registration screen not shown, such information as the identification number of the right needed to be invalidated, the applicable technical field, type of information required for invalidation, the party's credit card number necessary for charge processing, and the party's addresses for contact such as an e-mail address and a telephone number.

The registered party's information thus input through the inputting element 25 made of the keyboard and/or the mouse is forwarded by the transmitting-receiving element 21 over the network to the server 4 for registration. The server 4 processes and edits the received registration information in such a manner that the information may be disclosed to and browsed by third parties at the website run by the server management company 3 as shown in FIG. 2.

As with the unauthorized party 2, potential information providers 6 also use a data input apparatus composed of a personal computer to gain access to the URL address of the website run by the server management company 3 and browse through the registered information disclosed by the server 4.

The personal computer used by the information provider 6 is structurally the same as that employed by the unauthorized party 2. That is, the computer has a transmitting-receiving element 61, a displaying element 62, a system controller 63, a storing element 64, and an inputting element 65 made of a keyboard and/or a mouse which correspond, respectively, to the transmitting-receiving element 21, displaying element 22, system controller 23, storing element 24, and inputting element 25 constituting the unauthorized party's personal computer.

The information provider 6 browses through the registered information received over the network. If the information provider 6 believes he or she is in possession of information that may be used effectively to invalidate any of the rights included in the registered information being read, the information provider 6 may operate the inputting element 65 made of the keyboard and/or the mouse to input his or her e-mail address and account number along with information about the potentially useful invalidation material. The input information is sent over the network and registered with the server 4.

The server 4 is connected to a charge server 71 via the network 5. The server 4 feeds the charge server 71 with charge processing information whereby the unauthorized party 2 is made to pay a registration fee for registering with the server 4, whereby each information provider 6 is paid a consideration for the information he or she has offered, and whereby a contingent fee is paid to the information provider 6 when the right in question is successfully invalidated by use of the furnished information.

Second Embodiment

With the above-described first embodiment, the unauthorized party (registered party) wishing to invalidate a right holder's right solicits information from a plurality of information providers and, using the collected information and on his or her own initiative, proceeds with such efforts as filing an opposition to the right holder or seeking a trial for invalidation. The second embodiment, by contrast, is designed to let an information provider solely execute right-invalidating proceedings on behalf of the registered party.

The legal system including the patent law and statute varies from one country or region to another. In some cases, any party filing an opposition to a right holder cannot remain anonymous. That is, the registered party (unauthorized party) must file an opposition to the right holder, seek a trial for invalidation, or handle other related proceedings on his or her own initiative. If the unauthorized party's effort is not successful, i.e., if the right in dispute is adjudicated to retain its effectiveness, then a litigation can ensue between the party and the right holder.

Not all unauthorized parties have legal expertise to invalidate rights at issue on their own. In many cases, they are not prepared—financially or otherwise—to retain patent attorneys and other legal advisers or to find competent experts.

These cases are what the second embodiment seeks to take on. Specifically, the second embodiment constitutes a system that is useful where unauthorized parties strongly wish to remain anonymous trying to invalidate specific rights or where the parties have difficulty carrying out invalidation proceedings on their own initiative.

The second embodiment will now be described with reference to FIGS. 9 through 13. A right holder 31, an unauthorized party 32, a server management company 33, a server 34, a network 35, and a charge processing company 37 in FIG. 9 correspond respectively to the right holder 1, unauthorized party 2, server management company 3, server 4, network 5, and charge processing company 7 of the first embodiment described above.

More specifically, the right holder 31 represents a person or an entity in possession of intellectual property rights such as patents, utility models, trademarks, designs or copyrights. The unauthorized party 32 denotes a person or an entity that may be disadvantaged in future because of a right that belongs to the right holder 31. The server 34, server management company 33 and charge processing company 37 are organizations that transmit and receive information to and from the general public including the unauthorized party 32 over the network 35 such as the Internet. In so doing, these organizations carry out processes desired by registered parties (unauthorized parties 32).

The unauthorized party 32 registers information with the server 34 regarding a right in dispute which belongs to the right holder 31. The server management company 33 discloses at publicly accessible websites the information that has been entered into the server 34 by the unauthorized party 32 with respect to the specific right of the right holder 31.

In the above setup, the websites run by the server management company 33 on the Internet are designed to be browsed primarily by experts and specialized organizations such as law firms A (36-1) and B (36-2) and an investigation office (36-3). Obviously, the websites can also be browsed by individuals.

As with the first embodiment, the second embodiment requires that the unauthorized party 32 enter information related to a targeted right of the right holder 31 as well as information for charge processing involved, that the server management company 33 list the targeted rights at the websites, and that the charge processing company 37 execute necessary charge processing on predetermined occasions.

In such cases, the server management company 33 does not solicit information for invalidating the rights listed at the website but recruits individuals or organizations willing to carry out necessary proceedings such as those for invalidation on behalf of unauthorized parties.

Illustratively, in the website screen of FIG. 2, a browsing individual may click on any one of the listed rights targeted for invalidation. The clicking action calls up a screen such as one in FIG. 13. This screen is designed to recruit a person or an entity willing to perform proceedings for invalidating the right at issue.

In the example of FIG. 13, the screen includes regions for accommodating the name of the right in question, the amount of compensation for invalidation proceedings, the name of a company or an individual willing to take over the proceedings, an e-mail address through which communications are made, and an account to which a contingent fee is paid upon successful invalidation of the right in question.

Suppose now that law firms A (36-1) and B (36-2) as well as an investigation office (36-3), having read the solicitation, wish to take over the task of invalidating a specific right. In that case, the reading parties make entries into the screen of FIG. 13 and transmit their willingness to take up the challenge to the server management company 33. In turn, the server management company 33 notifies the unauthorized party 32 that parties have shown up who are willing to undertake the invalidation proceedings.

Figure 10:
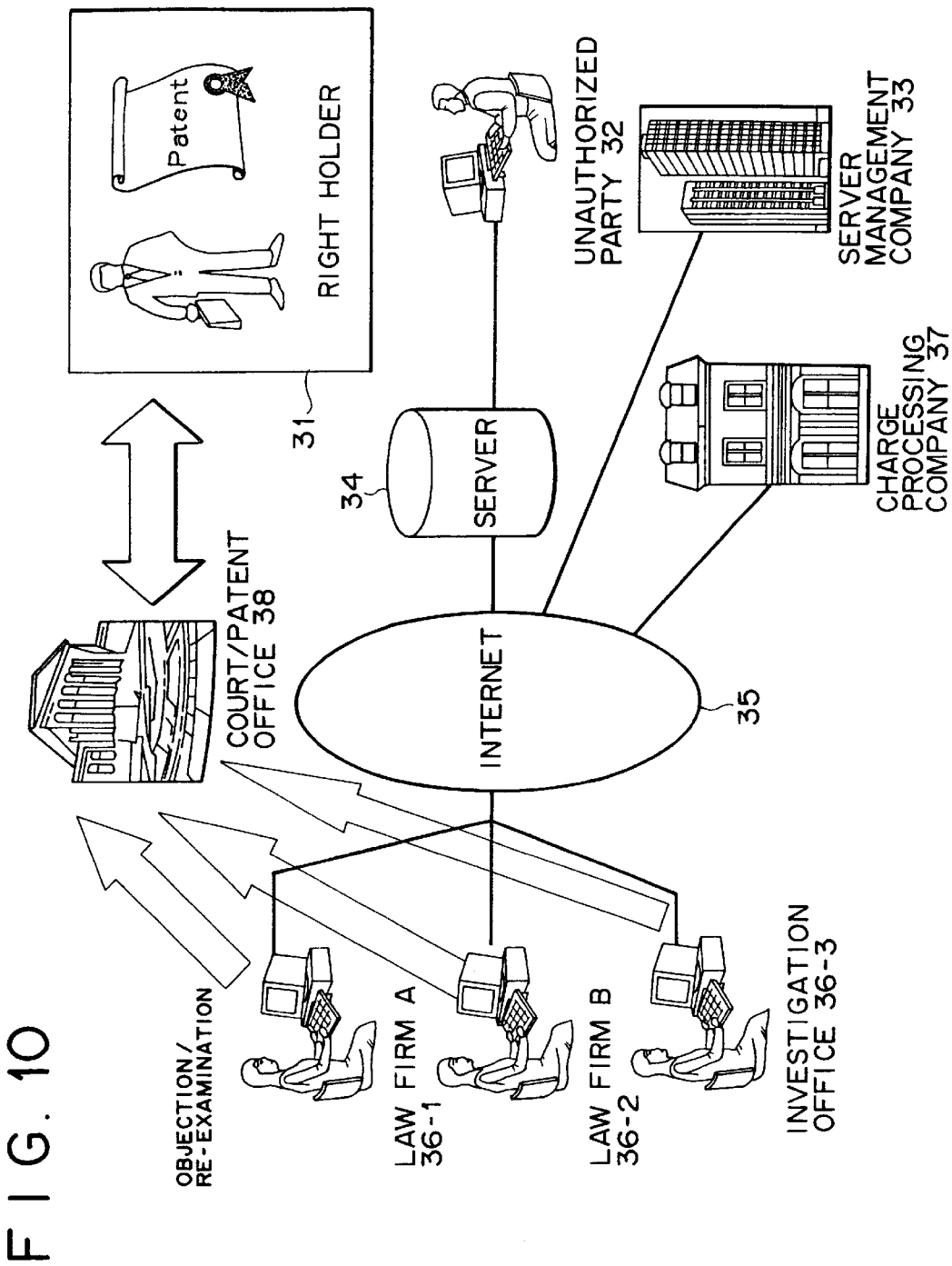
FIG. 10 is a schematic view showing how the second embodiment works.

In taking over the invalidating effort, the law firms A (36-1) and B (36-2) and the investigation office (36-3) file at the patent office and/or the court 38 such formalities as a request for a trial for invalidating the patent or other right possessed by the right holder 31, an opposition to the right holder 31, or a request for re-examination of the right in question, as depicted in FIG. 10.

Figure 11:
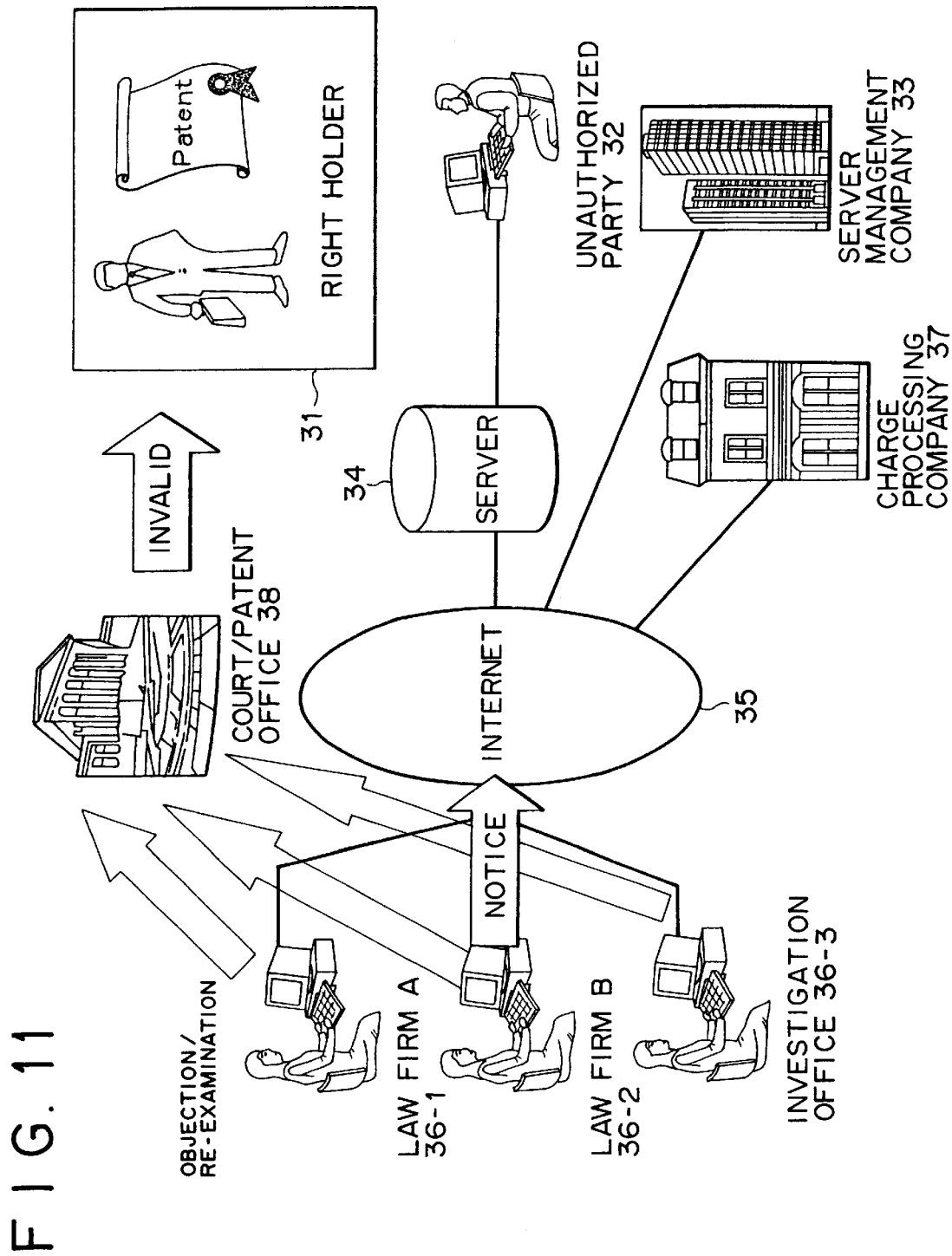
FIG. 11 is another schematic view depicting how the second embodiment works.

The patent office and/or the court 38 proceeds to conduct an appeal/trial examination or a trial between the right holder 31 or his agent on the one hand and the contesting party such as the law firm B (36-2) on the other hand. It is assumed here that based on the evidence and argument submitted by the law firm B (36-2), the patent office or the court 38 rules in favor of invalidating the right at issue, as shown in FIG. 11.

In that case, the law firm B (36-2) is notified of the invalidation of the right by the patent office or the court 38. The law firm B (36-2) then informs the server management company 33 that the right has now been invalidated on the basis of the argument and evident submitted by the firm.

The server management company 33 may have automatic access to a database service company that has past records of patent-related lawsuits and patent examinations formulated into databases. In gaining such access, the server management company 33 may periodically monitor the status of the patent being tried or examined. At the end of the trial or examination, the monitored result may be reported automatically by the server management company 33 to the registered party in question (unauthorized party 32).

Figure 12:
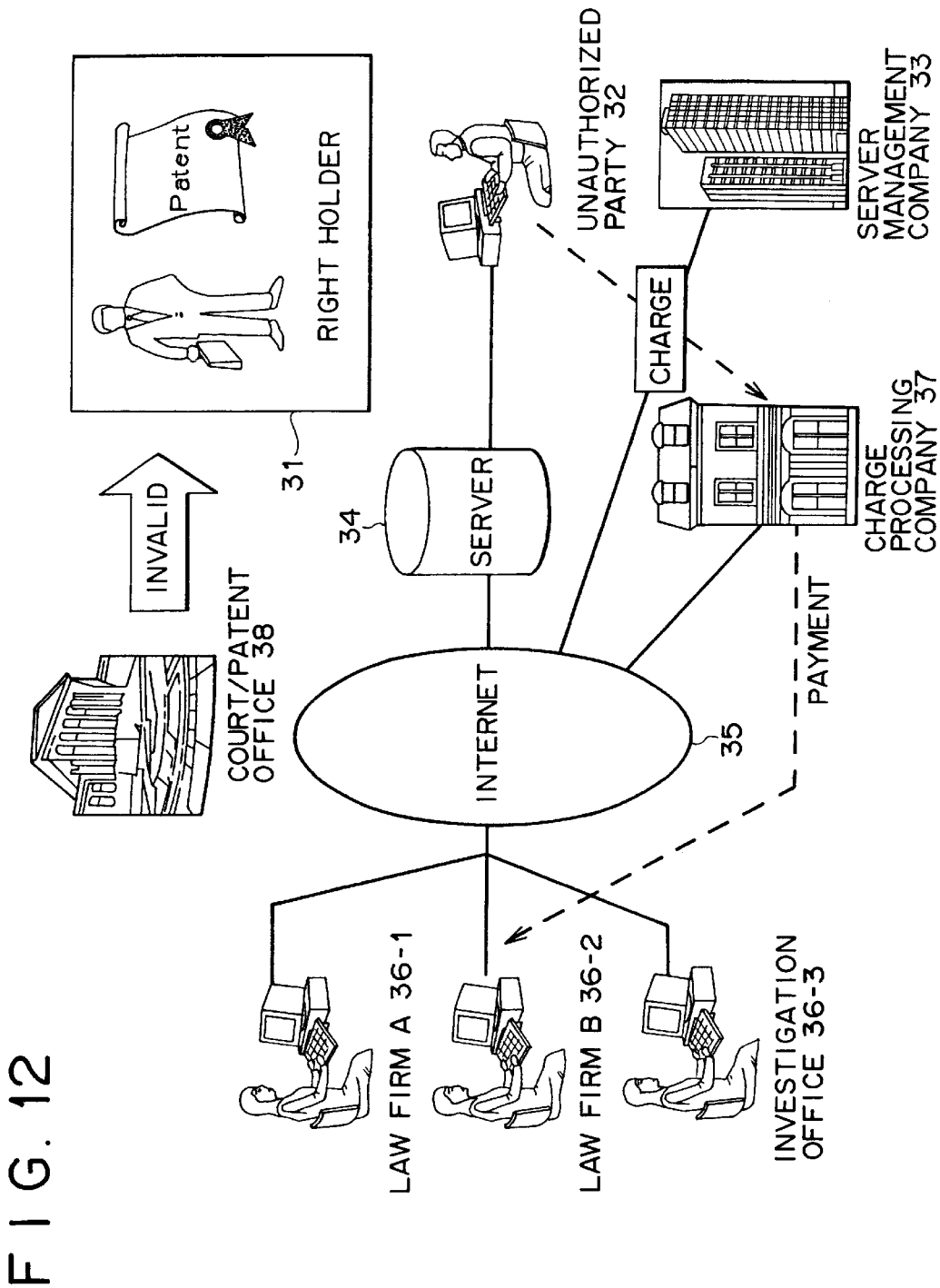
FIG. 12 is another schematic view indicating how the second embodiment works.

When informed of, say, extinguishments of the right in question as illustrated in FIG. 12, the unauthorized party 32 notifies the charge processing company 37 to pay a contingent fee from the party's account to the law firm B (36-2).

The contingent fee may vary in amount depending on the resulting status of the patent at issue, e.g., whether the patent has been invalidated, or limited in the scope of the claims that were claimed by the right holder 31, whereby interference is avoided.

With the second embodiment, as described, those who read the solicitation are invited to take the place of the registered party (unauthorized party 32) in pursuing invalidation proceedings illustratively by filing an opposition to the right holder or by filing for a trial for invalidation. This ensures the anonymity of the unauthorized party 32 during the proceedings and formalities. If the unauthorized party 32 has little legal knowledge concerning the matter in question, the necessary proceedings can still be effected on a proxy basis. Needless to say, as with the first embodiment, the second embodiment requires the server management company 33 and charge processing company 37 to keep the names of unauthorized parties strictly confidential in setting up websites for soliciting right invalidation on their behalf and charging the parties for the services rendered.

The second embodiment allows the unauthorized party 32 to invalidate or limit the right of the right holder 31 in a manner avoiding interference by having resource to pertinent expertise. In letting the unauthorized party 32 use professional help, the second embodiment keeps the party 32 strictly anonymous from the viewpoint of the right holder 31 being contested.

Those who read and respond to the solicitation will be able to turn information in their possession, their legal knowledge, and other relevant know-how to profit by taking over proceedings and formalities on behalf of someone else in need. In this regard, the second embodiment allows experts and specialists to promote their businesses more efficiently than before.

The server management company 33, for its part, can promote public interests by recruiting qualified and competent people in an appreciably efficient manner.

Although the present invention has been discussed mostly in conjunction with the first and second embodiments thereof, this is not limitative of the invention. Many variations are conceivable in terms of system configurations and charge processing flows. Illustratively, the server management company and the charge processing company may be organized into a single entity.

In detailing the embodiments, this specification has highlighted the circulation of materials and information for invalidating patents or similar rights as well as the solicitation for and recruitment of people with specific knowledge for invalidating such rights. However, that scheme is not limitative of the invention. This invention also applies illustratively to soliciting information about cinemas, music, and other diverse topics of hobbies and pastimes, and to inviting expert views by physicians, lawyers and other specialists on medical or legal matters or about specific topics of other disciplines.

In one of such cases, the soliciting third party may even be a physician asking other specialized authorities or experts (i.e., information providers) for opinions on a medical matter that may turn out to be beyond his or her expertise.

With this invention, the information provider may be an individual or an investigation office. Investigation offices and similar research organizations may constantly browse websites set up as per the invention to pick up potentially lucrative business opportunities; they may take the initiative in finding cases to work on instead of waiting for potential clients to show up and ask for their expertise, as has been customary so far.

In the second embodiment, the data input apparatus composed of a personal computer and used by the information providers 36-1, 36-2 and 36-3 as well as by the unauthorized party 32 is the same as the apparatus shown in FIG. 8 and thus will not be described further.

As described, one embodiment of this invention allows the unauthorized party potentially disadvantaged by someone else's right to utilize a globally extended network in soliciting materials and information that may be used to restrict or invalidate the right in question. This makes it possible efficiently to collect, or at least increase the possibility of collecting, relevant information and materials which are otherwise difficult to obtain. The unauthorized party may profit significantly from the appropriate information or material thus acquired when taking measures to invalidate the right at issue or to reach a settlement with the right holder.

Another embodiment of this invention allows those with little legal knowledge for invalidating a specific right to recruit experts or specialized organizations willing to take over the proceedings for invalidating the right in question, with the name of the recruiting party kept strictly confidential.

Under one scheme according to the invention, the unauthorized party pays a consideration for the useful information furnished by information providers or for the tasks accomplished on his or her behalf by competent individuals or organizations. The inventive scheme thus provides a market that stimulates the circulation of information, knowledge, know-how or expertise in the possession of individuals, specialists or entities.

Another feature of the invention is that it strictly maintains the anonymity of those whose solicit information, recruit competent personnel, and/or pay fees for what has been provided or accomplished. This feature encourages unauthorized parties to come forward and take advantage of the inventive system, thereby constituting another factor that stimulates the circulation of information, knowledge, know-how and expertise.

As many apparently different embodiments of this invention may be made without departing from the spirit and scope thereof, it is to be understood that the invention is not limited to the specific embodiments thereof except as defined in the appended claims.

What is claimed is:

1. An information providing apparatus comprising:

first receiving means for receiving information entered by a registered party about a right held by a right holder, and information for charge processing with regard to said registered party;

storing means for storing the information which is entered by said registered party about said right held by said right holder and which is received by said first receiving means;

transmitting means for readably transmitting to the general public the information stored in said storing means with regard to said right held by said right holder;

second receiving means for receiving information which is transmitted by a reader for use in invalidating said right; and charge processing means for effecting charge processing causing said registered party to pay a consideration to said reader for the information provided to invalidate said right, said charge processing being performed based on the information for charge processing with regard to said registered party.

2. An information providing apparatus according to claim 1, wherein said first receiving means and said second receiving means are constituted by a single receiving part.

3. An information providing apparatus according to claim 1, wherein said storing means encrypts said information for charge processing with regard to said registered party upon storing said information.

4. An information providing apparatus according to claim 1, wherein said transmitting means does not readably transmit the information about said registered party to the general public.

5. An information providing apparatus according to claim 1, wherein said charge processing means charges said registered party a registration fee when said registered party enters the information about said right held by said right holder.

6. An information providing apparatus according to claim 1, wherein, if said registered party invalidates said right of said right holder by use of the information provided by said reader, then said charge processing means charges said registered party a contingent fee to be paid to said reader.

7. An information providing apparatus comprising:

first receiving means for receiving information entered by a registered party about a right held by a right holder, and information for charge processing with regard to said registered party;

storing means for storing the information which is entered by said registered party about said right held by said right holder and which is received by said first receiving means;

transmitting means for readably transmitting to the general public the information stored in said storing means with regard to said right held by said right holder;

second receiving means for receiving information which is transmitted by a reader as a token of willingness to invalidate said right; and charge processing means which, if said reader invalidates said right, then effects charge processing causing said registered party to compensate said reader for the invalidation of said right.

8. An information providing apparatus according to claim 7, wherein said first receiving means and said second receiving means are constituted by a single receiving part.

9. An information providing apparatus according to claim 7, wherein said storing means encrypts said information for charge processing with regard to said registered party upon storing said information.

10. An information providing apparatus according to claim 7, wherein said transmitting means does not readably transmit the information about said registered party to the general public.

11. An information providing apparatus according to claim 7, wherein said charge processing means charges said registered party a registration fee when said registered party enters the information about said right held by said right holder.

12. A server apparatus for disclosing information entered by a registered party to the general public in order to solicit information from readers, said server apparatus comprising:

storing means for storing information entered by said registered party about a right held by a right holder;

transmitting means for readably transmitting to the general public the information stored in said storing means with regard to said right held by said right holder;

receiving means for receiving information which is transmitted by a reader for use in invalidating said right;

transferring means for transferring the information which is received by said receiving means from said reader, to said registered party for use in invalidating said right; and notifying means which, if said registered party receives the information for invalidating said right, then notifies a charge processing system to make said registered party pay a consideration to said reader for the information provided by said reader.

13. A server apparatus according to claim 12, wherein said transmitting means, said transferring means and said notifying means are constituted by a single transmitting part.

14. A server apparatus for disclosing information entered by a registered party to the general public in order to solicit information from readers, said server apparatus comprising:

storing means for storing information entered by said registered party about a right held by a right holder;

transmitting means for readably transmitting to the general public the information stored in said storing means with regard to said right held by said right holder;

receiving means for receiving information which is transmitted by a reader as a token of willingness to invalidate said right; and notifying means which, if said reader invalidates said right, then notifies a charge processing system to make said registered party pay a consideration to said reader for the invalidation of said right.

15. A server apparatus according to claim 14, wherein said transmitting means and said notifying means are constituted by a single transmitting part.

16. An information processing method for soliciting readers to provide information about a right which is held by a right holder and which is entered into a server by a registered party, the method comprising the steps of:

firstly receiving from a reader the information about said right entered into said server by said registered party;

transferring to said registered party the information received in said first receiving step with regard to said right;

if said right is invalidated by use of the transferred information about said right, then secondly receiving a charge processing order from said registered party; and notifying a charge processing system to make said registered party pay a consideration to said reader based on said charge processing order received in said second receiving step.

17. An information processing method for soliciting readers to furnish tokens of willingness to invalidate a right which is held by a right holder and which is entered into a server by a registered party, the method comprising the steps of:

firstly receiving information which is transmitted by a reader as a token of willingness to invalidate said right;

transferring to said registered party the information received in said first receiving step;

if said reader invalidates said right, then secondly receiving a charge processing order from said registered party; and notifying a charge processing system to make said registered party pay a consideration to said reader based on said charge processing order received in said second receiving step.

* * * * *